United States Patent
Ban et al.

(10) Patent No.: US 12,417,220 B2
(45) Date of Patent: Sep. 16, 2025

(54) GENERATIVE DATA MODELING USING LARGE LANGUAGE MODEL

(71) Applicant: SAP SE, Walldorf (DE)

(72) Inventors: Rui Ban, Xi'an (CN); Yucheng Guo, Xi'an (CN); Jing-tao Li, Xi'an (CN); Zezhen Han, Xi'an (CN); Borun Liu, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/584,307

(22) Filed: Feb. 22, 2024

(65) Prior Publication Data

US 2025/0272276 A1 Aug. 28, 2025

(51) Int. Cl.
G06F 16/23 (2019.01)
G06F 16/21 (2019.01)

(52) U.S. Cl.
CPC ........ *G06F 16/2358* (2019.01); *G06F 16/212* (2019.01); *G06F 16/219* (2019.01)

(58) Field of Classification Search
CPC ... G06F 16/2358; G06F 16/212; G06F 16/219
See application file for complete search history.

(56) References Cited

U.S. PATENT DOCUMENTS

| | | | |
|---|---|---|---|
| 8,051,094 B2 | 11/2011 | Agrawal et al. | |
| 11,379,537 B2 | 7/2022 | Chatelain et al. | |
| 11,556,398 B2* | 1/2023 | Tan | G06F 3/067 |
| 11,886,454 B2* | 1/2024 | Ergun | G06F 16/248 |
| 2012/0254143 A1* | 10/2012 | Varma | G06F 40/30 |
| | | | 707/706 |
| 2013/0346426 A1* | 12/2013 | O'Byrne | G06F 16/219 |
| | | | 707/E17.061 |
| 2019/0258942 A1* | 8/2019 | Gu | G16H 50/70 |
| 2020/0349129 A1* | 11/2020 | Bracholdt | G06F 16/24578 |
| 2021/0150476 A1 | 5/2021 | Resag et al. | |

(Continued)

FOREIGN PATENT DOCUMENTS

JP 20230040138 A * 3/2023 ......... G06Q 30/0278

OTHER PUBLICATIONS

Rivera, Sonny, "Conceptual vs Logical vs Physical Data Models", ThoughtSpot, [Online], https://www.thoughtspot.com/data-trends/data-modeling/conceptual-vs-logical-vs-physical-data-models, Jun. 1, 2023, 11 pgs. (Year: 2023).*

(Continued)

*Primary Examiner* — Matthew J Ellis
(74) *Attorney, Agent, or Firm* — SCHWEGMAN LUNDBERG & WOESSNER, P.A.

(57) ABSTRACT

A computer-implemented method may comprise receiving a first user input from a computing device and identifying a plurality of data assets from a catalog of data assets based on the first user input, where each data asset in the catalog of data assets comprises a corresponding entity that comprises data. The method may further comprise causing the identified plurality of data assets to be displayed on the computing device, receiving a first user selection of one or more of the identified plurality of data assets from the computing device, obtaining a plurality of data models based on the one or more of the identified plurality of data assets using a large language model, and causing the plurality of data models to be displayed on the computing device.

20 Claims, 9 Drawing Sheets

(56) References Cited

U.S. PATENT DOCUMENTS

| | | | |
|---|---|---|---|
| 2022/0407924 A1 | 12/2022 | Buchmann | |
| 2023/0021309 A1* | 1/2023 | Ahlstrom | G06N 5/022 |
| 2023/0195806 A1* | 6/2023 | Bhashyam | G06F 16/2358 |
| | | | 707/709 |
| 2023/0237053 A1* | 7/2023 | Dangoor | G06F 16/24539 |
| | | | 707/767 |

OTHER PUBLICATIONS

Schott, Madison "12 SQL query optimization best practices for cloud databases", ThoughtSpot, [Online], https://www.thoughtspot.com/data-trends/data-modeling/optimizing-sql-queries, Jun. 29, 2023, 10 pgs. (Year: 2023).*

"How to Update an Existing Data Model Using ERBuilder Generative AI feature (", Softbuilder (Blog, ERBuilder), [Online]. Retrieved from the Internet: <URL: https://soft-builder.com/how-to-update-an-existing-data-model-using-erbuilder-generative-ai-feature/>, (Apr. 19, 2023), 6 pgs.

"SAP Introduces SAP Datasphere to Simplify Customers' Data Landscape", SAP India News Center, [Online]. Retrieved from the Internet: <URL: https://news.sap.com/india/2023/03/sap-introduces-sap-datasphere-to-simplify-customers-data-landscape/>, (Mar. 16, 2023), 3 pgs.

Monawalia, "Unlock the full potential of your enterprise data with SAP Datasphere Catalog (Technology Blogs by SAP)", Sap Community, [Online]. Retrieved from the Internet: <URL: https://blogs.sap.com/2023/03/15/unlock-the-full-potential-of-your-enterprise-data-with-sap-datasphere-catalog/>, (Mar. 15, 2023), 7 pgs.

Rivera, Sonny, "Conceptual vs logical vs physical data models", ThoughtSpot, [Online]. Retrieved from the Internet: <URL: https://www.thoughtspot.com/data-trends/data-modeling/conceptual-vs-logical-vs-physical-data-models>, (Jun. 1, 2023), 11 pgs.

* cited by examiner

GENERATIVE DATA MODELING USING LARGE LANGUAGE MODEL

TECHNICAL FIELD

The present application relates generally to the technical field of computer systems, and, in various embodiments, to systems and methods of generative data modeling using a large language model.

BACKGROUND

Data models are a foundational element of software development and analytics. They provide a standardized method for defining and formatting database contents consistently across systems, enabling different applications to share the same data. Data modeling is a process used to define and analyze data requirements needed to support processes of an information system. As the diversity and magnitude of data grow, so does the complexity of modeling the data. Current data modeling software tools require users to manually select and configure every element of the data model they are attempting to define, often involving the user navigating through various views and windows to find the proper elements to include in the data model, as well as the proper configuration of the elements in the data model. As a result, current data modeling software tools suffer from an inefficient user interface. Other technical challenges may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems of generative data modeling using a large language model are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to implement generative data modeling using a large language model. In some example embodiments, a computer-implemented method may comprise receiving a first user input from a computing device and identifying a plurality of data assets from a catalog of data assets based on the first user input, where each data asset in the catalog of data assets comprises a corresponding entity that comprises data. The computer-implemented method may further comprise causing the identified plurality of data assets to be displayed on the computing device, receiving a first user selection of one or more of the identified plurality of data assets from the computing device, obtaining a plurality of data models based on the one or more of the identified plurality of data assets using a large language model, and causing the plurality of data models to be displayed on the computing device.

By using a large language model to generate a plurality of data models based on one or more user-selected data assets, the system and method of the present disclosure improve the user interface of data modeling software tools by significantly reducing the amount of content the user needs to navigate and browse through in defining a data model. As a result, the efficiency of the data modeling process is increased. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
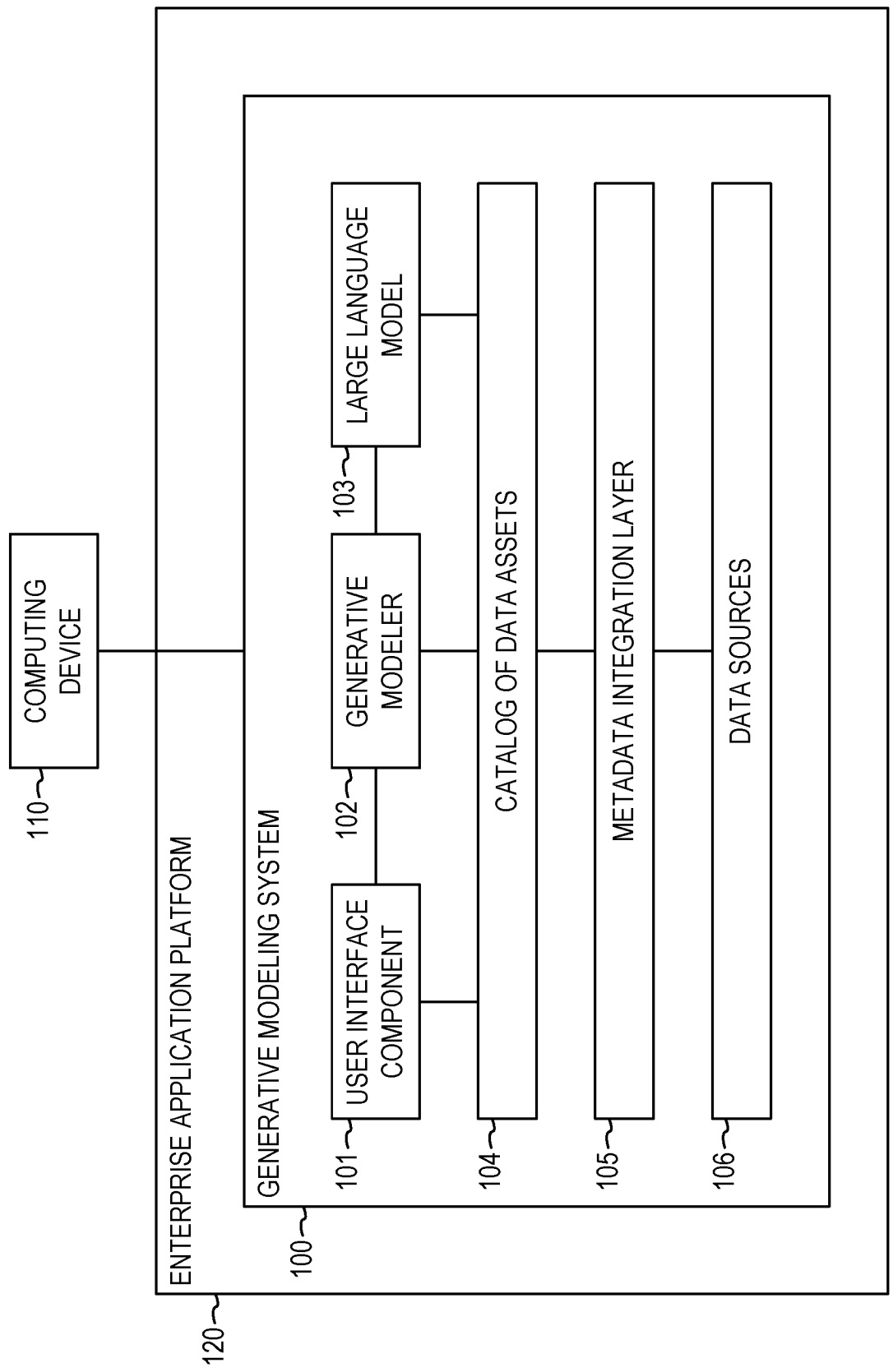
FIG. 1 is a block diagram illustrating an example generative modeling system.

FIG. 1 is a block diagram illustrating an example generative modeling system 100. In some example embodiments, the generative modeling system 100 may comprise any combination of one or more of a user interface component 101, a generative modeler 102, a large language model 103, a catalog of data assets 104, and a metadata integration layer 105, and a plurality of data sources 106. The components shown in FIG. 1 may be configured to communicate with each other via inter-process communication or via one or more network connections.

One or more of the components of the generative modeling system 100 may be implemented as part of a cloud-based system. For example, one or more of the components of the generative modeling system 100 may be incorporated into an enterprise application platform 120, providing server-side functionality via a network (e.g., the Internet) to a computing device 110 of a user. The enterprise application platform 120 may comprise web servers and Application Program Interface (API) servers that can be coupled to, and provide web and programmatic interfaces to, application servers. The application servers can be, in turn, coupled to one or more database servers that facilitate access to the data sources 106. The web servers, API servers, application servers, and database servers can host cross-functional services, which may include relational database modules to provide support services for access to the data sources 106. Additionally or alternatively, one or more of the components of the generative modeling system 100 may be installed and run on a local on-premise network of the computing device 110 or on the computing device 110 itself.

In some example embodiments, the generative modeling system 100 may be configured to provide a data modeling software tool that makes the data modeling process easier and more efficient for users of the data modeling software tool. The data modeling software tool may enable the user of the computing device 110 to diagram data flows by interacting with the user interface component 101 via the computing device 110. For example, when creating a new database structure, the user may provide input to the user interface component 101 to create a diagram of how data will flow into and out of the database. This flow diagram may be used to define the characteristics of the data formats, structures, and database handling functions to efficiently support a particular set of data flow requirements. The data model that results from this process may provide a framework of relationships between data elements within a database.

The user interface component 101 may be configured to receive user input from the computing device 110 of the user. The user input may be used by the user interface component 101 to build a data model. For example, the user interface component 101 may provide drag and drop functionality, enabling the user to drag and drop elements into a data model and build connections between elements. The user interface component 101 may additionally or alternatively enable the user to provide other types of user input as well, including, but not limited to, natural language text comprising instructions for creating or editing a data model.

The generative modeler 102 may be configured to serve as a back-end service that accepts requests from the user interface component 101 and sends the large language model 103 prompts that encapsulate user input for creating a data model and metadata of data assets retrieved from the catalog of data assets 104. The catalog of data assets 104 may comprise a software application that creates and manages an inventory of an organization's data assets. A data asset may comprise any entity that is comprised of data. Examples of a data asset include, but are not limited to, a table, a database, an output file, and a document. Other types of data assets are also within the scope of the present disclosure. The catalog of data assets 104 may store metadata of data assets. The metadata integration layer 105 may be configured to extract metadata from the data sources 106. The metadata integration layer 105 may also be configured to keep the metadata stored in the catalog of data assets 104 in sync with changes to the corresponding data assets in the data sources 106. The large language model, may be used by the generative modeling system 100 in three distinct scenarios: (1) generating initial data models based on metadata from the catalog of data assets 104, (2) refining a user-selected data model based on user input, and (3) enriching the metadata contained in the catalog of data assets 104. The features and functions of the components of the generative modeling system 100 will be discussed in further detail below.

Figure 2:
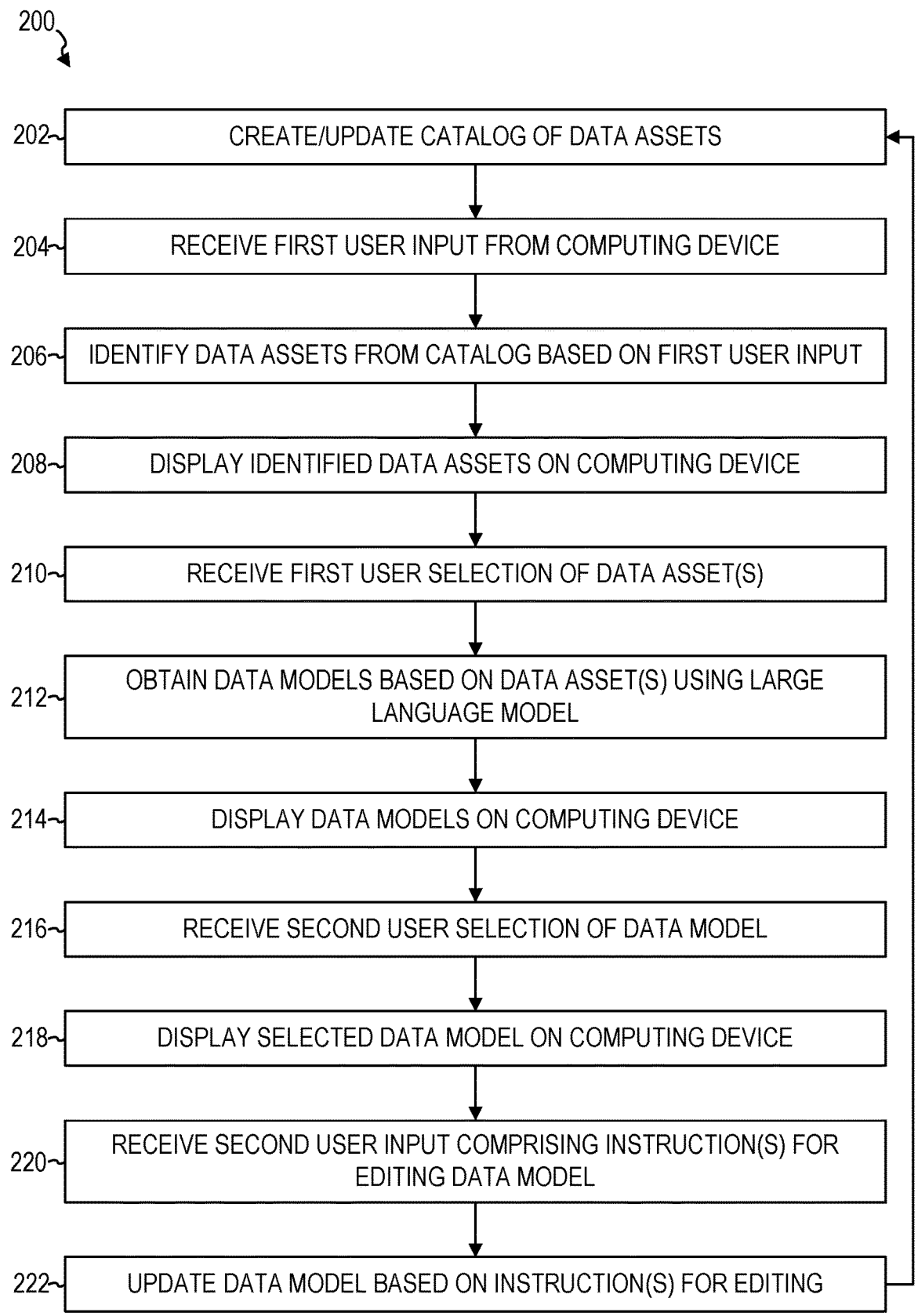
FIG. 2 is a flowchart illustrating an example method of implementing generative modeling using a large language model.

FIG. 2 is a flowchart illustrating an example method 200 of implementing generative modeling using a large language model. The method 200 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 200 are performed by the generative modeling system 100 of FIG. 1 or any combination of one or more of its components.

At operation 202, the generative modeling system 100 may create or update the catalog of data assets 104. For example, the metadata integration layer 105 may establish a corresponding network connection between the catalog of data assets 104 and each one of the plurality of data sources 106, and the catalog of data assets 104 may obtain metadata of the plurality of data assets from the plurality of different data sources 106 using the corresponding network connections and then store the metadata of the plurality of data assets in the catalog of data assets 104. In some example embodiments, the metadata may comprise one or more of a name for the corresponding data asset, a description for the corresponding data asset, a schema for the corresponding data asset, or a data lineage for the corresponding data asset. However, other types of metadata are also within the scope of the present disclosure.

The generative modeling system 100 may detect a change in the metadata of one of the data assets in the catalog of data assets 104 using the corresponding network connection with the data source 106 corresponding to the data asset. In response to, or otherwise based on, the detection of the change in the metadata, the generative modeling system 100 may update the catalog of data assets 104 to include the detected change in the metadata of the data asset.

The generative modeling system 100 may also obtain data lineage of the data assets in the catalog of data assets 104 from the plurality of different data sources 106 using the corresponding network connections. In response to, or otherwise based on, the obtaining of the data lineage of the data assets, the generative modeling system 100 may store the data lineage of the plurality of data assets in the catalog of data assets 104. Data lineage may provide a record of a data asset throughout its lifecycle, including source information and any data transformations that have been applied.

Additionally, the generative modeling system 100 may obtain a corresponding natural language description of the data assets using the large language model 103. The generative modeling system 100 may obtain the corresponding natural language description by sending the large language model 103, or another large language model, data of the corresponding data asset (e.g., data included in rows and columns of a table) or metadata of the corresponding data asset. The large language model 103 may generate the corresponding natural language description based on the data or metadata. In response to, or otherwise based on, the obtaining of the corresponding natural language description of the data assets, the generative modeling system 100 may store the corresponding natural language descriptions of the data assets in the catalog of data assets 104.

Next, the generative modeling system 100 may, at operation 204, receive a first user input from the computing device 110. In some example embodiments, the first user input may comprise one or more terms entered by a user of the computing device 110 into a search field displayed on the computing device 110. However, other types of user input are also within the scope of the present disclosure.

The generative modeling system 100 may then identify a plurality of data assets from the catalog of data assets 104 based on the first user input, at operation 206. Each data asset in the catalog of data assets 104 may comprise a corresponding entity that comprises data. For example, one or more of the plurality of data assets may comprises a table of data. However, other types of data assets are also within the scope of the present disclosure. In some example embodiments, the identifying of the plurality of data assets may comprise searching the catalog of data assets 104 for the first user input, and, for each data asset in the plurality of data assets, determining that data (e.g., data in cells of a table) or metadata of the data asset matches the first user input based on the searching of the catalog of data assets 104. The identifying of the plurality of data assets may be based on the determination that the data or metadata of the plurality of data assets matches the first user input. In some example embodiments, the identifying of the plurality of data assets may comprise comparing the first user input to the metadata of the plurality of data assets stored in the catalog of data assets. The identifying of the plurality of data assets may additionally or alternatively be based on the data lineage of the plurality of data assets stored in the catalog of data assets 104 or the corresponding natural language descriptions of the plurality of data assets stored in the catalog of data assets 104.

At operation 208, the generative modeling system 100 may cause the identified plurality of data assets to be displayed on the computing device 110. The displaying of the identified plurality of data assets may comprise displaying representations of the data assets. For example, the generative modeling system 100 may display a box containing a name of a table to represent the table as opposed to displaying the contents of the table itself.

Figure 3:
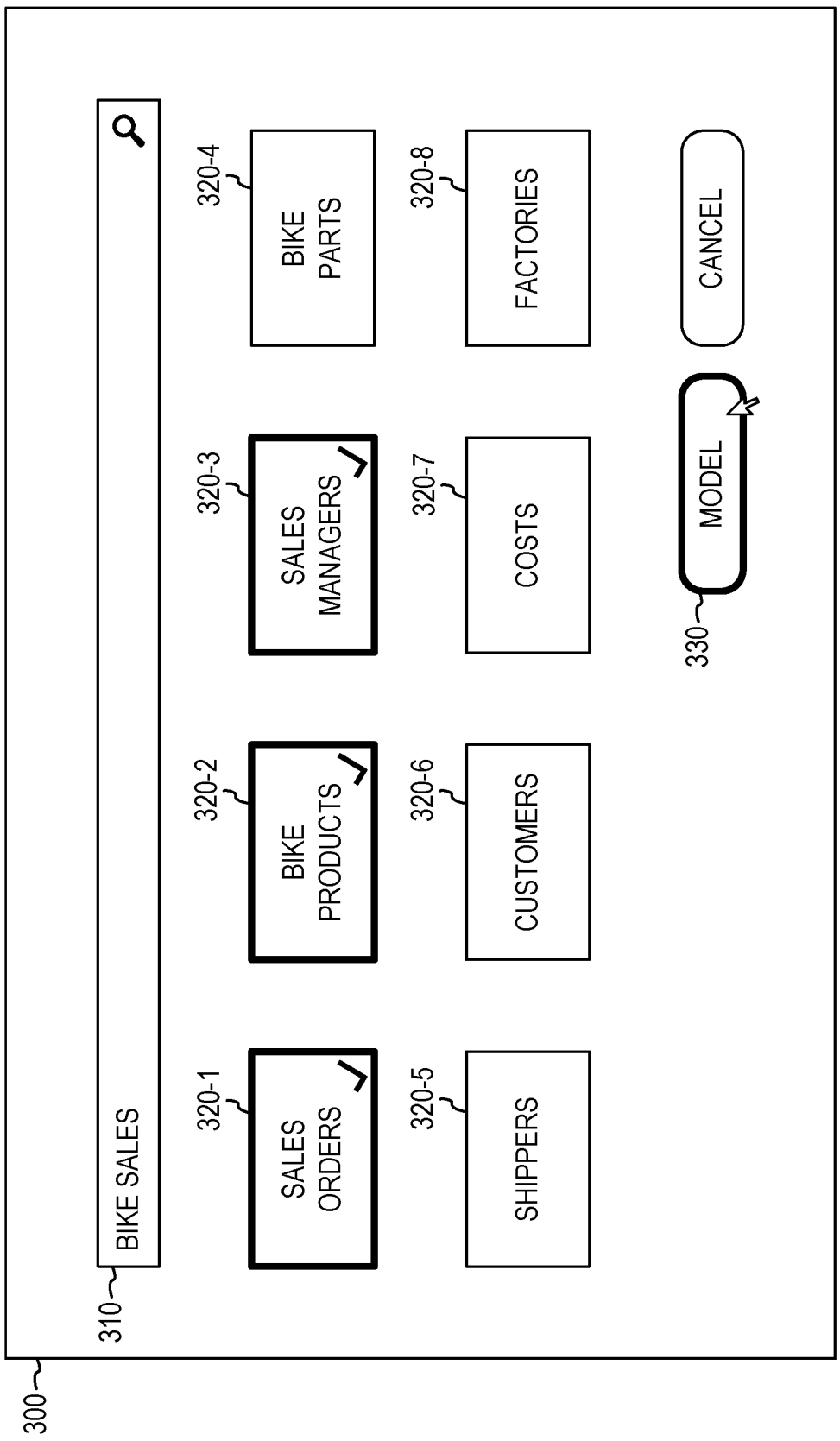
FIG. 3 illustrates an example graphical user interfaces (GUI) in which a plurality of data assets are displayed based on a user input.

Next, the generative modeling system 100 may, at operation 210, receive a first user selection of one or more of the identified plurality of data assets from the computing device 110. FIG. 3 illustrates an example GUI 300 in which a plurality of data assets 320 are displayed based on a user input. In the example shown in FIG. 3, the plurality of data assets 320 comprises data asset 320-1 corresponding to a table of sales orders, data asset 320-2 corresponding to a table of bike products, data asset 320-3 corresponding to a table of sales managers, data asset 320-4 corresponding to a table of bike parts, data asset 320-5 corresponding to a table of shippers, data asset 320-6 corresponding to a table of customers, data asset 320-7 corresponding to a table of costs, and data asset 320-8 corresponding to a table of factories. The plurality of data assets 320 may be displayed in response to the user of the computing device 110 submitting a first user input, such as by the user entering the terms "bike sales" into a search field 310 displayed on the computing device 110. The GUI 300 may be configured to receive a first user selection of one or more of the identified plurality of data assets 320 from the user. For example, the user may click on, or otherwise select, data assets 320-1, 320-2, and 320-3, and then select a user interface element 330 configured to submit these selected data assets as the first user selection for use in generating data models.

Referring back to FIG. 2, at operation 212, the generative modeling system 100 may obtain a plurality of data models based on the one or more of the identified plurality of data assets using the large language model 103. The large language model 103 may comprise an artificial intelligence algorithm that uses deep learning techniques and massively large data sets to understand, summarize, and generate data models. The plurality of data models may comprise the one or more data assets selected by the user.

In some example embodiments, the obtaining of the plurality of data models may comprise retrieving metadata of the one or more of the identified plurality of data assets from the catalog of data assets 104 based on the first user selection, sending a first request to the large language model 103, where the first request comprises the retrieved metadata and is configured to prompt the large language model 103 to generate the plurality of data models based on the retrieved metadata, and receiving the plurality of data models from the large language model 103. The retrieved metadata may comprise one or more of a name for the corresponding data asset, a description for the corresponding data asset, a schema for the corresponding data asset, or a data lineage for the corresponding data asset. However, other types of metadata are also within the scope of the present disclosure.

The obtaining of the plurality of data models may further comprise determining that one of the plurality of data models does not satisfy a format or grammar rule. For example, the large language model 103 may return the plurality of data models to the generative modeler 102 in code format, such as shown in the following example below:

```
[
    {
        "id" : "id0",
        "operator" : "join",
        "parameters" : {
            "left" : "SalesOrders.PRODUCT_ID",
            "right" : "BikeProducts.ID",
            "type" : "inner"
        }
    },
    {
        "id" : "id1",
        "operator" : "filter",
        "parameters" : {
            "operator" : "equal",
            "property" : "STATUS",
            "value" : "FINISHED"
        }
    },
    {
        "id" : "id2",
        "operator" : "join",
        "parameters" : {
            "left" : "id1.SALES_MANAGER_ID",
            "right" : "SalesManagers.ID",
            "type" : "inner"
        }
    },
    {
        "id" : "id3",
        "operator" : "output",
        "parameters" : {
            "name" : "SalesReport"
        }
    }
]
```

The generative modeler 102 may access a set of format and grammar rules to determine whether the plurality of data models satisfy the set of format and grammar rules. The set of format and grammar rules may comprise at least one format rule specifying how to format the code representing a data model (e.g., conventions for the style of the code), as well as at least one grammar rule specifying how to write code statements that are valid for a programming language (e.g., rules that specify how characters and words may be put one after the other to form valid statements) in order to guarantee that the generated code is runnable on the generative modeling system 100. The set of format and grammar rules may be stored by the generative modeler 102 based on specifications input by a user of the generative modeling system 100. The generative modeler 102 may be configured to detect format and grammar errors it detects in the data models it receives from the large language model 103. In some example embodiments, the generative modeler 102 may send an indication that the one of the plurality of data models does not satisfy the format rule to the large language model 103. The indication may include details identifying the format rule and the portion of the code representing the data model that does not comply with the format rule. The large language model 103 may then generate a corrected version of the data model using the details included in the indication, and then return the corrected version of the data model. The generative modeler 102 may then receive a corrected version of the data model.

The generative modeling system 100 may, at operation 214, cause the plurality of data models to be displayed on the computing device. The generative modeling system 100 may process the code representing the data models returned by the large language model 103 and render visual representations of the data models based on the processing of the code. In some example embodiments, the generative modeling system 100 may display the data models in a carousel, such as one data model displayed on the screen of the computing device 110 at a time, while displaying one or more user interface elements configured to navigate from one data model to another upon selection by the user. Alternatively, the generative modeling system 100 may also display all of the data models concurrently on the same page or within the same view.

Figure 4:
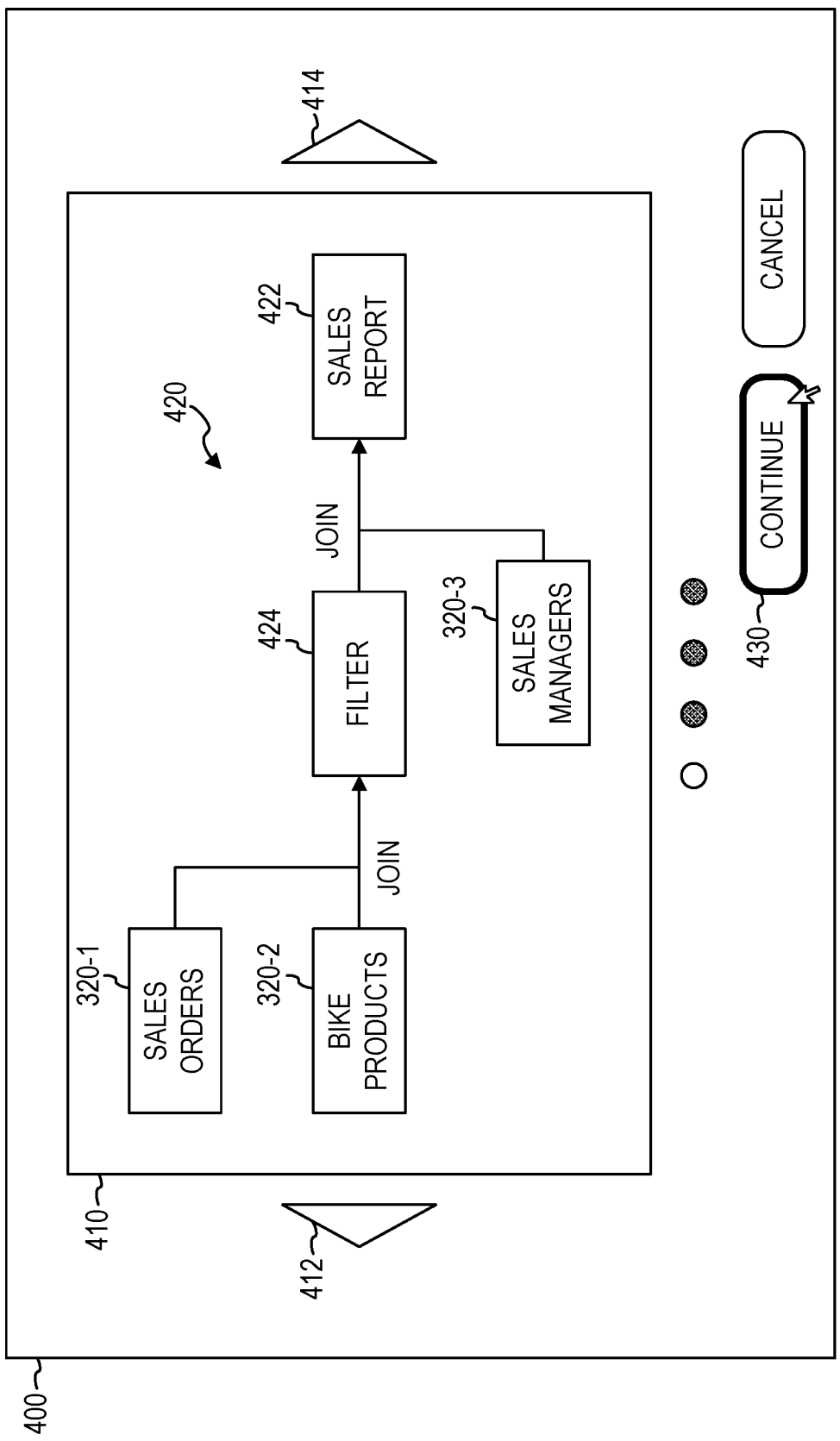
FIG. 4 illustrates an example GUI in which a plurality of data models are displayed based on a user selection of one or more data assets.

The generative modeling system 100 may receive a second user selection of one of the plurality of data models from the computing device 110, at operation 216. FIG. 4 illustrates an example GUI 400 in which a plurality of data models 420 are displayed based on a user selection of one or more data assets. In the example GUI 400, the data models 420 are displayed one at a time within a window 410, and the user may navigate from one data model 420 to another by selecting user interface elements 412 or 414. In the example shown in FIG. 4, the data model 420 being displayed comprises data assets 320-1, 320-2, and 330-3, as well as other elements, such as a filter 424 and an output file 422. The GUI 400 may be configured to receive the second user selection of one of the data models 420 from the user, thereby enabling the user to select one of the plurality of data models 420 for further modeling. For example, the user may click on, or otherwise select, a user interface element 430 configured to submit the data model 420 currently being displayed in the window 410 as the second user selection.

At operation 218, the generative modeling system 100 may cause the selected data model to be displayed on the computing device 110 based on the second user selection. The generative modeling system 100 may also cause the display of one or more user interface elements configured to enable the user to provide user input for editing the selected data model.

The generative modeling system 100 may, at operation 220, receive a second user input from the computing device 110. In some example embodiments, the second user input may comprise one or more instructions for editing the selected data model displayed on the computing device 110. The second user input may comprise a natural language prompt, and the data model may be updated based on the natural language prompt using the large language model 103 or another large language model.

Figure 5:
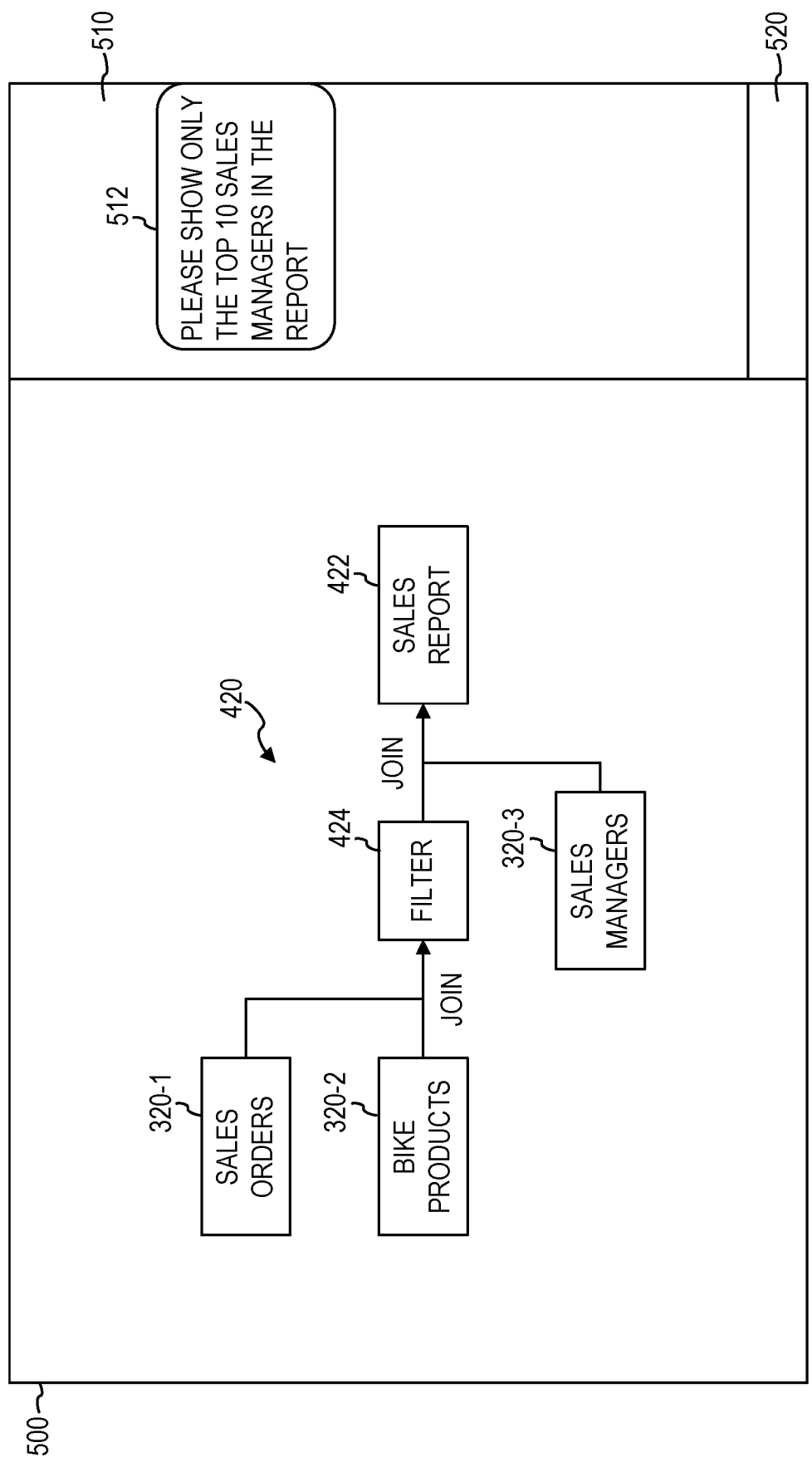
FIG. 5 illustrates an example GUI in which a data model is displayed in response to a user selection of the data model from a plurality of data models.

FIG. 5 illustrates an example GUI 500 in which the data model 420 is displayed in response to a user selection of the data model 420 from the plurality of data models 420. In FIG. 5, the GUI 500 comprises a conversation panel 510 that displays the communication between the user of the computing device 110 and a chatbot of the generative modeling system 100. In the example shown in FIG. 5, the user has submitted the second user input in the form of an instruction 512 for editing the selected data model 420. The instruction 512 may be entered by the user via a text field 520, and, upon submission by the user, may be displayed within the conversation panel 510.

Figure 6:
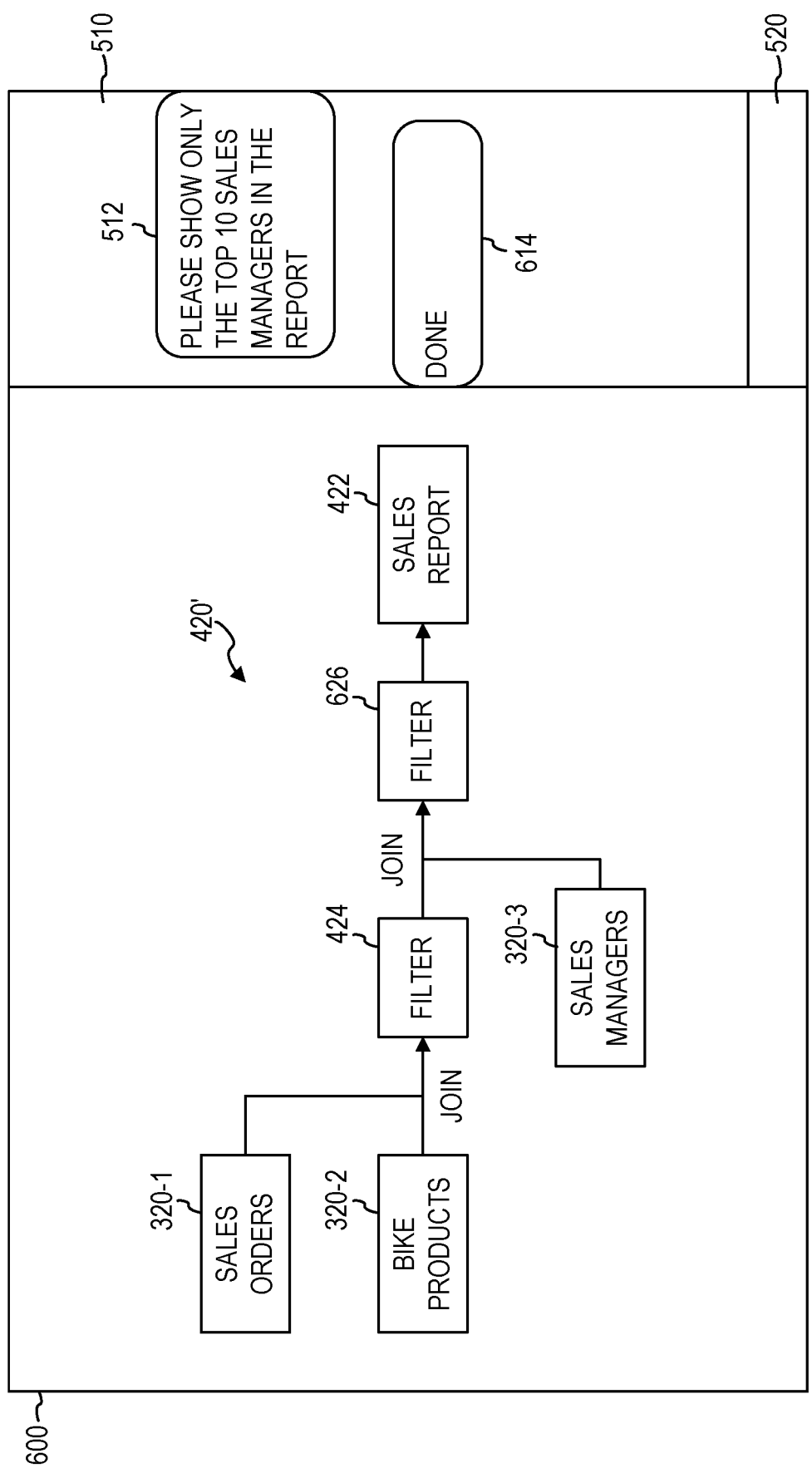
FIG. 6 illustrates an example GUI in which the data model displayed in FIG. 5 has been updated based on user input comprising an instruction for editing the data model.

Referring back to FIG. 2, at operation 222, the generative modeling system 100 may update the selected data model 420 displayed on the computing device 110 based on the one or more instructions for editing the selected data model 420. FIG. 6 illustrates an example GUI 600 in which the data model 420 displayed in FIG. 5 has been updated based on user input comprising an instruction for editing the data model 420. For example, the instruction provided by the user in FIG. 5 was "PLEASE SHOW ONLY THE TOP 10 SALES MANAGERS IN THE REPORT." Based on this instruction, the generative modeling system 100 has generated an updated version of the data model 420' that has added a filter 626 in accordance with the instruction. The generative modeling system 100 may display a confirmation 614 in the conversation panel 510 to indicate that the instruction for editing the data model has been executed. The user may provide multiple rounds of instructions for editing the data model 420 or the updated version of the data model 420'. When the user is satisfied with the data model, the user may provide input instructing the generative modeling system 100 to store the data model for subsequent use.

It is contemplated that any of the other features described within the present disclosure can be incorporated into the method 200.

Figure 7:
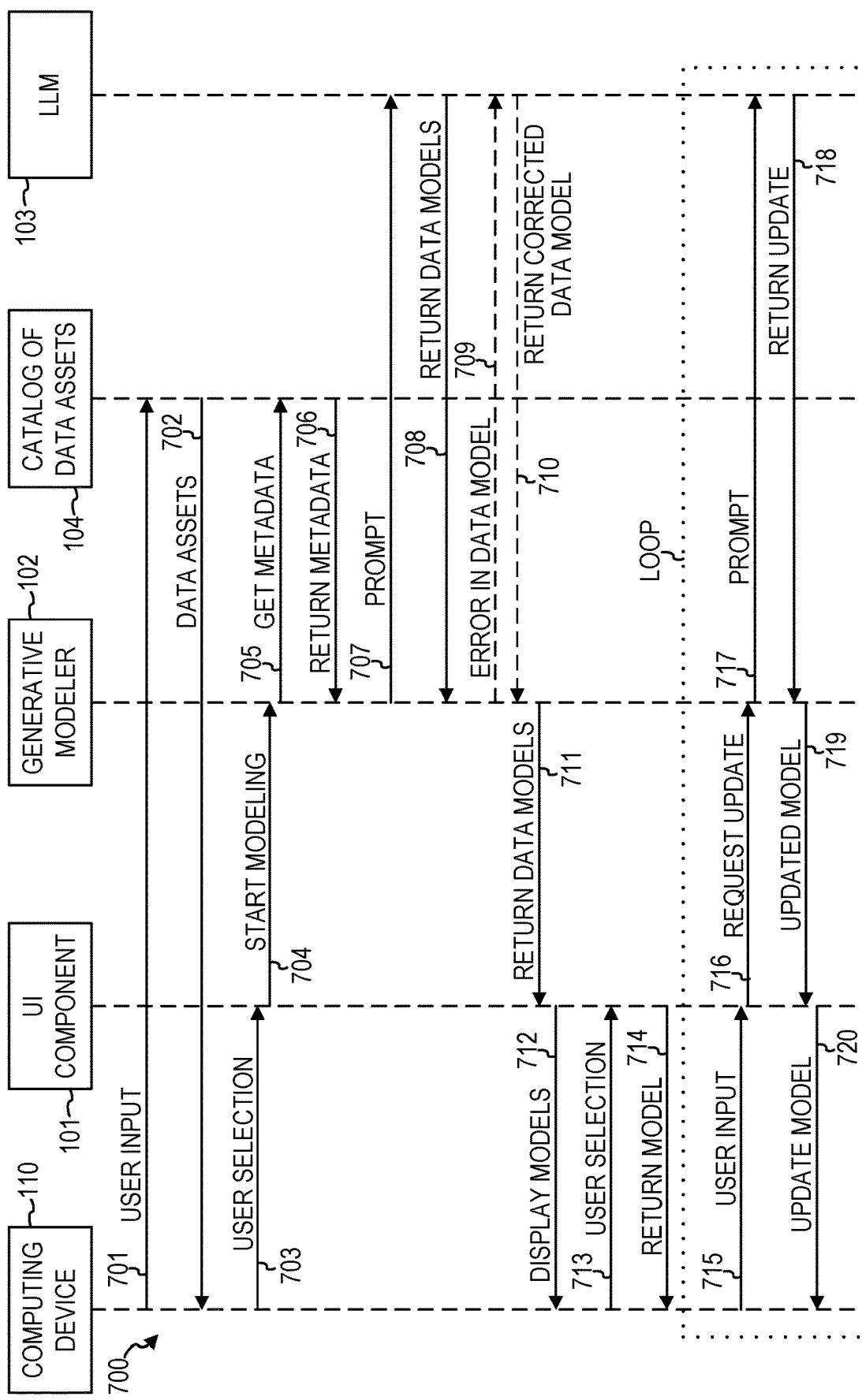
FIG. 7 is a sequence diagram illustrating an example method of implementing generative modeling using a large language model.

FIG. 7 is a sequence diagram illustrating an example method 700 of implementing generative modeling using a large language model. The method 700 can be performed by processing logic that can comprise hardware (e.g., circuitry, dedicated logic, programmable logic, microcode, etc.), software (e.g., instructions run on a processing device), or a combination thereof.

At operation 701, a user of the computing device 110 may provide a first user input via the computing device 110, and the computing device 110 may send the first user input to the catalog of data assets 104. The first user input may comprise one or more terms entered by the user into a search field displayed on the computing device 110. At operation 702, the catalog of data assets 104 identifies a plurality of data assets from the catalog of data assets 104 based on the first user input, and then sends the identified plurality of data assets back to the computing device 110 for display on the computing device 110. Each data asset in the catalog of data assets 104 may comprise a corresponding entity that comprises data. In some example embodiments, the catalog of data assets 104 may identify the plurality of data assets by searching the catalog of data assets 104 for the first user input, and then determining that data or metadata of the plurality of data assets matches the first user input based on the searching of the catalog of data assets 104, where the identifying of the plurality of data assets is based on the determination that the data or metadata of the plurality of data assets matches the first user input.

At operation 703, the user interface component 101 may receive a first user selection of one or more of the identified plurality of data assets from the computing device 110. In response to receiving the first user selection, the user interface component 101 may, at operation 704, send a request to the generative modeler 102 to start a data modeling process. This request may comprise an identification of the one or more data assets selected by the user. In response to receiving the request to start the modeling process, the generative modeler 102 may send a request to the catalog of data assets 104 to get metadata of the one or more selected data assets based on the first user selection, at operation 705. At operation 706, the catalog of data assets 104 may search for metadata stored in association with the one or more selected data assets, and then return the associated metadata to the generative modeler 102. The metadata may comprise one or more of a name for the corresponding data asset, a description for the corresponding data asset, a schema for the corresponding data asset, or a data lineage for the corresponding data asset. Other types of metadata are also within the scope of the present disclosure.

At operation 707, the generative modeler 102 may send a request to the large language model 103. The request may comprise the metadata and be configured to prompt the large language model 103 to generate a plurality of data models based on the metadata. The large language model 103 may then, at operation 708, generate the plurality of data models using the metadata and return the generated plurality of data models back to the generative modeler 102. The generative modeler 102 may optionally verify whether the plurality of data models satisfy a set of format and grammar rules. For example, the set of format and grammar rules may comprise at least one format rule specifying how to format the code representing a data model (e.g., conventions for the style of the code), as well as at least one grammar rule specifying how to write code statements that are valid for a programming language (e.g., rules that specify how characters and words may be put one after the other to form valid statements) in order to guarantee that the generated code is runnable on the generative modeling system 100. The set of format and grammar rules may be stored by the generative modeler 102 based on specifications input by a user of the generative modeling system 100. The generative modeler 102 may be configured to detect format and grammar errors it detects in the data models it receives from the large language model 103. If one of the data models does not satisfy a particular formal or grammar rule, then the generative modeler 102 may, at operation 709, send an indication of this error in the data model to the large language model 103. The large language model 103 may then use this indication to generate a corrected version of the data model, and return the corrected version of the data model to the generative modeler, at operation 710.

The generative modeler 102 may, at operation 711, send the data models to the user interface component 101, which may then cause the data models to be displayed on the computing device 110, at operation 712. At operation 713, the user interface component 101 may receive a second user selection of one of the plurality of data models from the computing device 110. The user interface component 101 may then cause the selected data model to be displayed on the computing device 110, at operation 714, based on the second user selection and display one or more user interface elements configured to enable the user to fine-tune the selected data model.

The user may engage in a looping fine-tuning process in which the user provides, via the computing device 110, a user input comprising one or more instructions for editing the selected data model to the user interface component 101, at operation 715, and the user interface component 101 sends a corresponding request to update the selected data model to the generative modeler 102, at operation 716. At operation 717, the generative modeler 102 may send a prompt to the large language model 103 to update the selected model. This prompt may comprise an indication of the one or more instructions for editing the selected data model provided by the user. The large language model 103 may then, at operation 718, update the selected data model based on the one or more instructions for editing the selected data model and return the updated model to the generative modeler 102, which may send the updated model to the user interface component 101, at operation 719. At operation 720, the user interface component 101 may then cause the updated model to be displayed on the computing device 110 for the user to decide whether to adopt the current version of the data model or continue refining the data model. This cycle of fine-tuning can be repeated multiple times until the user attains an ideal data model.

It is contemplated that any of the other features described within the present disclosure can be incorporated into the method 700.

Figure 8:
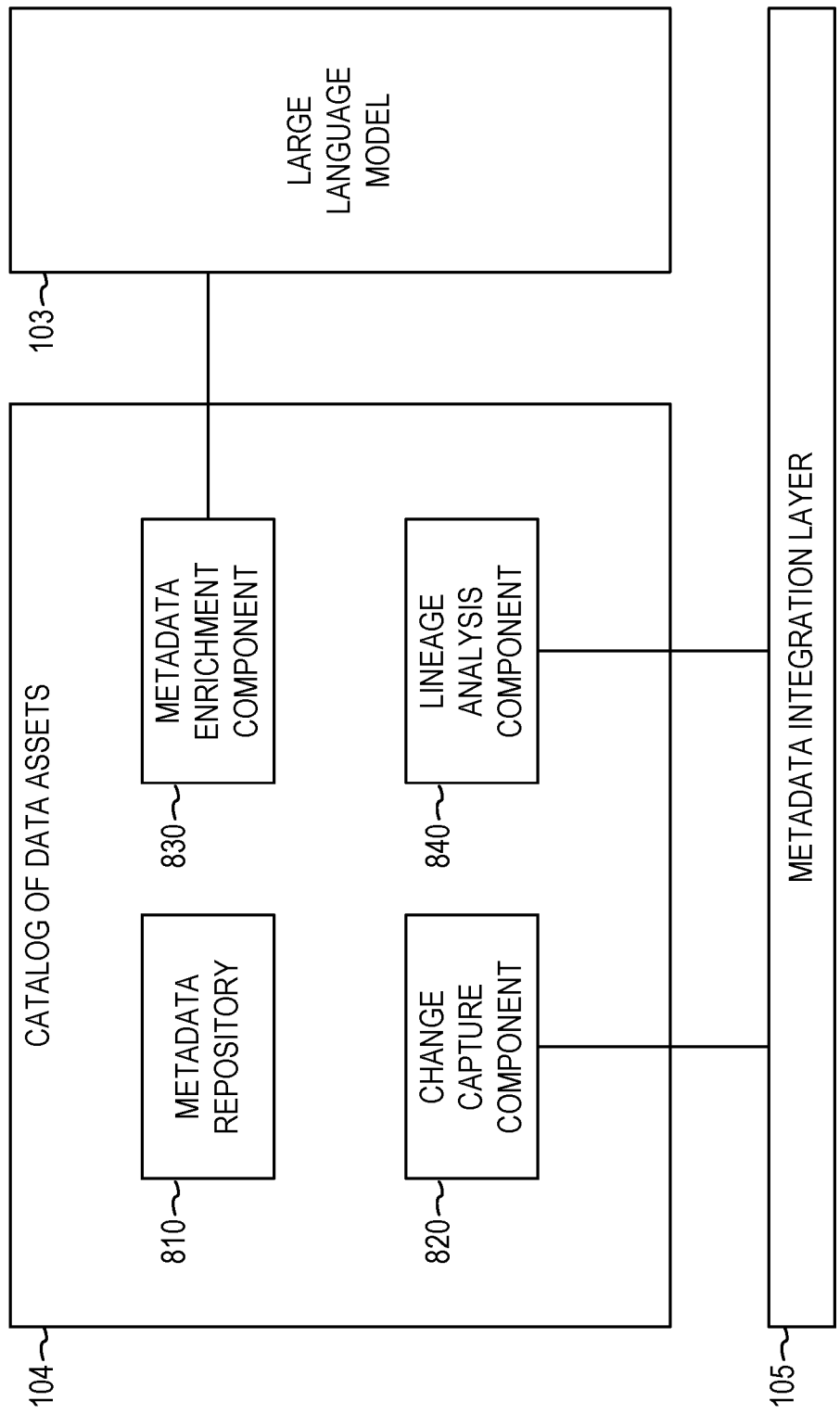
FIG. 8 is a block diagram illustrating an example catalog.

FIG. 8 is a block diagram illustrating an example catalog of data assets 104. In some example embodiments, the catalog of data assets 104 may comprise a metadata repository 810, a change capture component 820, a metadata enrichment component 830, and a lineage analysis component 840. The change capture component 820 may be configured to manage extraction of metadata from the data sources 106 via the metadata integration layer 105. The change capture component 820 may track metadata alterations in the data sources 106, and then update the metadata repository based on the tracked alterations.

The metadata enrichment component 830 may be configured to send a request to the large language model 103 to generate a corresponding natural language description of each one of the plurality of data assets in the catalog of data assets 104. The request may include data or metadata of each data asset. The metadata enrichment component 830 may then store the natural language descriptions in association with their corresponding data assets in the catalog of data assets 104. The metadata enrichment component 830 may also be configured to automatically generate business tags and glossary terms for each data asset based on the data or metadata of the data asset. The metadata enrichment component 830 may send a request to the large language model 103 to generate one or more business tags or glossary terms for a data asset based on the data or metadata of the data asset. The metadata enrichment component 830 may store the generated business tags and glossary terms in association with their corresponding data assets in the catalog of data assets 104.

The lineage analysis component 840 may be configured to fetch lineage information from the data sources 106 via the metadata integration layer 105. The data gathered by the change capture component 820, the metadata enrichment component 830, and the lineage analysis component 840 may be stored in the metadata repository 810 for subsequent transmission to the large language model 103 as metadata of the corresponding data asset(s) for use in generating the data models.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving a first user input from a computing device; identifying a plurality of data assets from a catalog of data assets based on the first user input, each data asset in the catalog of data assets comprising a corresponding entity that comprises data; causing the identified plurality of data assets to be displayed on the computing device; receiving a first user selection of one or more of the identified plurality of data assets from the computing device; obtaining a plurality of data models based on the one or more of the identified plurality of data assets using a large language model; and causing the plurality of data models to be displayed on the computing device.

Example 2 includes the computer-implemented method of example 1, wherein the first user input comprises one or more terms entered by a user of the computing device into a search field displayed on the computing device.

Example 3 includes the computer-implemented method of example 1 or example 2, wherein one or more of the plurality of data assets comprises a table of data.

Example 4 includes the computer-implemented method of any one of examples 1 to 3, wherein the identifying of the plurality of data assets comprises: searching the catalog of data assets for the first user input; and for each data asset in the plurality of data assets, determining that data or metadata of the data asset matches the first user input based on the searching of the catalog of data assets, wherein the identifying of the plurality of data assets is based on the determining that the data or metadata of the plurality of data assets matches the first user input.

Example 5 includes the computer-implemented method of any one of examples 1 to 4, wherein the plurality of data models comprises the identified plurality of data assets.

Example 6 includes the computer-implemented method of any one of examples 1 to 5, wherein the obtaining of the plurality of data models comprises: retrieving metadata of the one or more of the identified plurality of data assets from the catalog of data assets based on the first user selection; sending a first request to the large language model, the first request comprising the retrieved metadata and being configured to prompt the large language model to generate the plurality of data models based on the retrieved metadata; and receiving the plurality of data models from the large language model.

Example 7 includes the computer-implemented method of any one of examples 1 to 6, wherein the obtaining of the plurality of data models further comprises: determining that one of the plurality of data models does not satisfy a rule, the rule comprising a format rule or a grammar rule; sending an indication that the one of the plurality of data models does not satisfy the rule to the large language model; and receiving a corrected version of the one of the plurality of data models based on the sending of the indication.

Example 8 includes the computer-implemented method of any one of examples 1 to 7, wherein the retrieved metadata comprises one or more of a name for the corresponding data asset, a description for the corresponding data asset, a schema for the corresponding data asset, or a data lineage for the corresponding data asset.

Example 9 includes the computer-implemented method of any one of examples 1 to 8, further comprising: establishing a corresponding network connection with each one of a plurality of data sources; obtaining metadata of the plurality of data assets from the plurality of different data sources using the corresponding network connections; and storing the metadata of the plurality of data assets in the catalog of data assets, wherein the identifying of the plurality of data assets comprises comparing the first user input to the metadata of the plurality of data assets stored in the catalog of data assets.

Example 10 includes the computer-implemented method of any one of examples 1 to 9, further comprising: detecting a change in the metadata of one of the data assets in the plurality of data assets; and updating the catalog of data assets to include the detected change in the metadata of the one of the data assets in the plurality of data assets.

Example 11 includes the computer-implemented method of any one of examples 1 to 10, further comprising: obtaining data lineage of the plurality of data assets from the plurality of different data sources using the corresponding network connections; and storing the data lineage of the plurality of data assets in the catalog of data assets, wherein the identifying of the plurality of data assets is further based on the data lineage of the plurality of data assets stored in the catalog of data assets.

Example 12 includes the computer-implemented method of any one of examples 1 to 11, further comprising: obtaining a corresponding natural language description of each one of the plurality of data assets using the large language model or another large language model; and storing the corresponding natural language descriptions of the plurality of data assets in the catalog of data assets, wherein the identifying of the plurality of data assets is further based on the corresponding natural language descriptions of the plurality of data assets stored in the catalog of data assets.

Example 13 includes the computer-implemented method of any one of examples 1 to 12, further comprising: receiving a second user selection of one of the plurality of data models from the computing device; and causing the one of the plurality of data models to be displayed on the computing device based on the second user selection.

Example 14 includes the computer-implemented method of any one of examples 1 to 13, further comprising: receiving a second user input from the computing device, the second user input comprising one or more instructions for editing the one of the plurality of data models displayed on the computing device; and updating the one of the plurality of data models displayed on the computing device based on the one or more instructions for editing the one of the plurality of data models.

Example 15 includes the computer-implemented method of any one of examples 1 to 14, wherein the second user input comprises a natural language prompt, and the one of the plurality of data models is updated based on the natural language prompt using the large language model or another large language model.

Example 16 includes a system comprising: at least one processor; and a non-transitory computer-readable medium storing executable instructions that, when executed, cause the at least one processor to perform the method of any one of examples 1 to 15.

Example 17 includes a non-transitory machine-readable storage medium, tangibly embodying a set of instructions that, when executed by at least one processor, causes the at least one processor to perform the method of any one of examples 1 to 15.

Example 18 includes a machine-readable medium carrying a set of instructions that, when executed by at least one processor, causes the at least one processor to carry out the method of any one of examples 1 to 15.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 9:
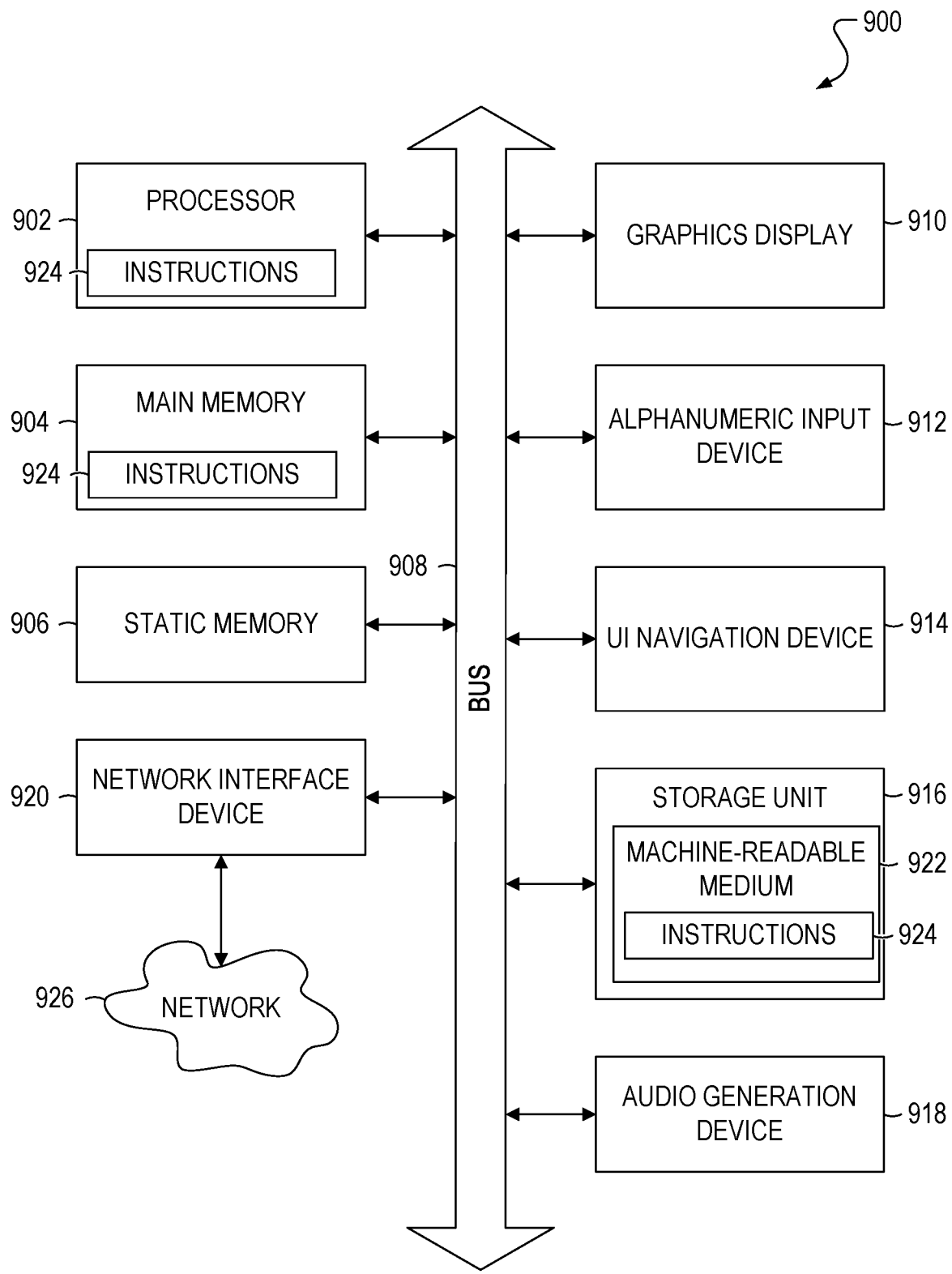
FIG. 9 is a block diagram of an example computer system on which methodologies described herein can be executed.

FIG. 9 is a block diagram of a machine in the example form of a computer system 900 within which instructions 924 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a graphics or video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a storage unit (e.g., a disk drive unit) 916, an audio or signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communications networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
   receiving a first user input from a computing device;
   identifying a plurality of data assets from a catalog of data assets based on the first user input, each data asset in the catalog of data assets comprising a corresponding entity that comprises data;
   causing the identified plurality of data assets to be displayed on the computing device;
   receiving a first user selection of one or more of the identified plurality of data assets from the computing device;
   retrieving metadata of the one or more of the identified plurality of data assets from the catalog of data assets based on the first user selection;
   sending a first request to a large language model, the first request comprising the retrieved metadata and being configured to prompt the large language model to generate a plurality of data models based on the retrieved metadata;
   receiving the plurality of data models from the large language model;
   determining that one of the plurality of data models does not satisfy a rule, the rule comprising a format rule;
   sending an indication that the one of the plurality of data models does not satisfy the rule to the large language model;
   receiving a corrected version of the one of the plurality of data models based on the sending of the indication; and
   causing the plurality of data models to be displayed on the computing device, wherein the causing of the plurality of data models to be displayed on the computing device comprises rendering a visual representation of the corrected version of the one of the plurality of data models based on processing of code representing the corrected version of the one of the plurality of data models.

2. The computer-implemented method of claim 1, wherein the first user input comprises one or more terms entered by a user of the computing device into a search field displayed on the computing device.

3. The computer-implemented method of claim 1, wherein one or more of the plurality of data assets comprises a table of data.

4. The computer-implemented method of claim 1, wherein the identifying of the plurality of data assets comprises:
   searching the catalog of data assets for the first user input; and
   for each data asset in the plurality of data assets, determining that data or metadata of the data asset matches the first user input based on the searching of the catalog of data assets,
   wherein the identifying of the plurality of data assets is based on the determining that the data or metadata of the plurality of data assets matches the first user input.

5. The computer-implemented method of claim 1, wherein the plurality of data models comprises the identified plurality of data assets.

6. The computer-implemented method of claim 1, wherein the retrieved metadata comprises one or more of a name for the corresponding data asset, a description for the corresponding data asset, a schema for the corresponding data asset, or a data lineage for the corresponding data asset.

7. The computer-implemented method of claim 1, further comprising:
   establishing a corresponding network connection with each one of a plurality of data sources;
   obtaining metadata of the plurality of data assets from the plurality of data sources using the corresponding network connections; and
   storing the metadata of the plurality of data assets in the catalog of data assets, wherein the identifying of the plurality of data assets comprises comparing the first user input to the metadata of the plurality of data assets stored in the catalog of data assets.

8. The computer-implemented method of claim 7, further comprising:
detecting a change in the metadata of one of the data assets in the plurality of data assets; and
updating the catalog of data assets to include the detected change in the metadata of the one of the data assets in the plurality of data assets.

9. The computer-implemented method of claim 7, further comprising:
obtaining data lineage of the plurality of data assets from the plurality of data sources using the corresponding network connections; and
storing the data lineage of the plurality of data assets in the catalog of data assets, wherein the identifying of the plurality of data assets is further based on the data lineage of the plurality of data assets stored in the catalog of data assets.

10. The computer-implemented method of claim 7, further comprising:
obtaining a corresponding natural language description of each one of the plurality of data assets using the large language model or another large language model; and
storing the corresponding natural language descriptions of the plurality of data assets in the catalog of data assets, wherein the identifying of the plurality of data assets is further based on the corresponding natural language descriptions of the plurality of data assets stored in the catalog of data assets.

11. The computer-implemented method of claim 1, further comprising:
receiving a second user selection of one of the plurality of data models from the computing device; and
causing the one of the plurality of data models to be displayed on the computing device based on the second user selection.

12. The computer-implemented method of claim 11, further comprising:
receiving a second user input from the computing device, the second user input comprising one or more instructions for editing the one of the plurality of data models displayed on the computing device; and
updating the one of the plurality of data models displayed on the computing device based on the one or more instructions for editing the one of the plurality of data models.

13. The computer-implemented method of claim 12, wherein the second user input comprises a natural language prompt, and the one of the plurality of data models is updated based on the natural language prompt using the large language model or another large language model.

14. A system comprising:
at least one hardware processor; and
a non-transitory computer-readable medium storing executable instructions that, when executed, cause the at least one hardware processor to perform computer operations comprising:
receiving a first user input from a computing device;
identifying a plurality of data assets from a catalog of data assets based on the first user input, each data asset in the catalog of data assets comprising a corresponding entity that comprises data;
causing the identified plurality of data assets to be displayed on the computing device;
receiving a first user selection of one or more of the identified plurality of data assets from the computing device;
retrieving metadata of the one or more of the identified plurality of data assets from the catalog of data assets based on the first user selection;
sending a first request to a large language model, the first request comprising the retrieved metadata and being configured to prompt the large language model to generate a plurality of data models based on the retrieved metadata;
receiving the plurality of data models from the large language model;
determining that one of the plurality of data models does not satisfy a rule, the rule comprising a format rule;
sending an indication that the one of the plurality of data models does not satisfy the rule to the large language model;
receiving a corrected version of the one of the plurality of data models based on the sending of the indication; and
causing the plurality of data models to be displayed on the computing device, wherein the causing of the plurality of data models to be displayed on the computing device comprises rendering a visual representation of the corrected version of the one of the plurality of data models based on processing of code representing the corrected version of the one of the plurality of data models.

15. The system of claim 14, wherein the first user input comprises one or more terms entered by a user of the computing device into a search field displayed on the computing device.

16. The system of claim 14, wherein one or more of the plurality of data assets comprises a table of data.

17. The system of claim 14, wherein the identifying of the plurality of data assets comprises:
searching the catalog of data assets for the first user input; and
for each data asset in the plurality of data assets, determining that data or metadata of the data asset matches the first user input based on the searching of the catalog of data assets,
wherein the identifying of the plurality of data assets is based on the determining that the data or metadata of the plurality of data assets matches the first user input.

18. A non-transitory machine-readable storage medium tangibly embodying a set of instructions that, when executed by at least one hardware processor, causes the at least one hardware processor to perform computer operations comprising:
receiving a first user input from a computing device;
identifying a plurality of data assets from a catalog of data assets based on the first user input, each data asset in the catalog of data assets comprising a corresponding entity that comprises data;
causing the identified plurality of data assets to be displayed on the computing device;
receiving a first user selection of one or more of the identified plurality of data assets from the computing device;
retrieving metadata of the one or more of the identified plurality of data assets from the catalog of data assets based on the first user selection;
sending a first request to a large language model, the first request comprising the retrieved metadata and being configured to prompt the large language model to generate a plurality of data models based on the retrieved metadata;

receiving the plurality of data models from the large language model;

determining that one of the plurality of data models does not satisfy a rule, the rule comprising a format rule;

sending an indication that the one of the plurality of data models does not satisfy the rule to the large language model;

receiving a corrected version of the one of the plurality of data models based on the sending of the indication; and causing the plurality of data models to be displayed on the computing device, wherein the causing of the plurality of data models to be displayed on the computing device comprises rendering a visual representation of the corrected version of the one of the plurality of data models based on processing of code representing the corrected version of the one of the plurality of data models.

19. The non-transitory machine-readable storage medium of claim 18, wherein one or more of the plurality of data assets comprises a table of data.

20. The non-transitory machine-readable storage medium of claim 18, wherein the operations further comprise:

receiving a second user selection of one of the plurality of data models from the computing device; and causing the one of the plurality of data models to be displayed on the computing device based on the second user selection.

\* \* \* \* \*